United States Patent [19]
Sasaki et al.

[11] Patent Number: 5,746,934
[45] Date of Patent: May 5, 1998

[54] ELECTRO RHEOLOGICAL FLUID COMPRISING LYOTROPIC LIQUID CRYSTALLINE POLYMER

[75] Inventors: Makoto Sasaki; Takafumi Ishii; Katsuhiko Haji, all of Yokohama, Japan

[73] Assignee: Nippon Oil Co., Ltd., Tokyo, Japan

[21] Appl. No.: 638,441

[22] Filed: Apr. 26, 1996

Related U.S. Application Data

[63] Continuation of Ser. No. 396,696, Mar. 1, 1995, Pat. No. 5,536,428.

[30] Foreign Application Priority Data

Mar. 1, 1994 [JP] Japan ..................... 6-54423

[51] Int. Cl.[6] .......................... C10M 171/00
[52] U.S. Cl. ................. 252/77; 252/73; 252/572
[58] Field of Search ................... 252/572, 73, 77

[56] References Cited

U.S. PATENT DOCUMENTS

| 5,354,489 | 10/1994 | Inoue et al. | 252/73 |
| 5,536,428 | 7/1996 | Sasaki et al. | 252/77 |

FOREIGN PATENT DOCUMENTS

| 478034 | 4/1992 | European Pat. Off. |
| 0579229 | 1/1994 | European Pat. Off. |
| 579229 | 1/1994 | European Pat. Off. |

OTHER PUBLICATIONS

Database WPI, Section Ch, Week 9314, Derwent Publications Ltd., London, Great Britain, Class A85, AN 93–111695 & JP-A-04 348 194 (Asahi Chem Ind. Co. Ltd.), Dec. 3, 1992.

Yang et al, "Electrorheology of Poly(n–hexyl Isocyanate) Solutions", Rheology Bulletin, vol. 60, No. 2, Jul. 1991.

Chem Abs, AN 120:78273, "Electroheology of a nematic poly(n–hexyl isocyanate) solution", Yang et al, Aug. 1992.

*Primary Examiner*—Christine Skane
*Attorney, Agent, or Firm*—Ostrolenk, Faber, Gerb & Soffen, LLP

[57] ABSTRACT

A homogeneous electro rheological fluid is provided. The fluid comprises a lyotropic liquid crystalline polymer dissolved in a solvent in low concentrations in a manner in which the fluid does not exhibit a liquid crystalline state. According to the homogeneous electro rheological fluid of the present invention, the problem associated with the precipitation of particles can be circumvented. Moreover, the electro rheological fluid can provide a large difference in torque before and after the application of an electric field; therefore, exhibits good electro rheological properties.

8 Claims, No Drawings

5,746,934

1

ELECTRO RHEOLOGICAL FLUID COMPRISING LYOTROPIC LIQUID CRYSTALLINE POLYMER

This is a continuating case based on application Ser. No. 08/396,696, filed Mar. 1, 1995 now U.S. Pat. No. 5,536,428.

BACKGROUND OF THE INVENTION

1. Field of the Invention

The present invention relates to an electro rheological fluid. More particularly, the present invention relates to a homogeneous electro rheological fluid, the viscosity being able to be controlled by the application of an electric field.

2. Background Art

An electro rheological fluid has been known in the art as a liquid suspension comprising inorganic or polymeric particles dispersed in an electric insulating liquid. The liquid changes its viscosity rapidly and reversibly from a liquid to a plastic or a solid state when an electric field is applied. The phenomenon is called an electro rheological effect or the Winslow effect.

Particles of which the surface is polarized with ease when an electric field is applied are generally used as the foregoing dispersed particles. Examples of the dispersible inorganic particles include silica (U.S. Pat. No. 3,047,507, British Patent No. 1,076,754 and Japanese Patent Laid-Open Publication No.61-44998), and Zeolite (Japanese Patent Laid-Open Publication No. 62-95397).

Examples of the polymeric particles include an alginic acid, a glucose having carboxyl group, a glucose having sulphonic group (Japanese Patent Laid-Open Publication No. 51-33783), a divinylbenzene-crosslinked polyacrylic acid (Japanese Patent Laid-Open Publication No. 53-93186), and a resole-type phenolic resin (Japanese Patent Laid-Open Publication No. 58-179259).

Further, examples of the electric insulating liquids include hydrocarbon-type oils, silicone oils, ester-type oils, and fluorine-type oils.

Examples of the expected application field of electro rheological fluids are engine mounts, shock absorber, clutches, and the like.

However, a major problem associated with the foregoing electro rheological fluid has been the precipitation/separation of particles from the dispersed system. This fact is the main cause that prevents the conventional electro rheological fluid from being applied commercially.

Numerous attempts with limited success have been made to develop a homogeneous electro rheological fluid such as, for example, an electro rheological fluid prepared by use of a low-molecular weight liquid crystal such as methoxybenzylidene butylaniline [Japanese Journal of Applied Physics, 17, page 1525 (1978)]. Such a homogeneous fluid has very poor electro rheological effect.

In addition to the foregoing, Japanese Patent Publication No. 42-11315 discloses a liquid crystalline polymer-containing homogeneous solution having an electro rheological effect, and Japanese Patent Laid-Open Publication Nos. 4-191511 and 4-266997, and preparatory notes for the 16th forum on liquid crystal, page 82 (1990) describe a solution comprising a poly(γ-benzyl L-glutamate), which is known as a lyotropic liquid crystalline polymer, dissolved in a low-boiling polar solvent such as dioxane, tetrahydrofuran, cresol; or a low-boiling chlorine-type solvent such as methylene chloride, and chloroform, wherein said solution can exert a marked electro rheological effect.

2

The foregoing electro rheological fluid prepared by use of the poly(γ-benzyl L-glutamate) is a homogeneous system, and has a fairly good electro rheological effect and, therefore, the foregoing problems associated with the precipitation and separation of particles can be circumvented. The viscosity of the fluid, however, becomes high even before the application of an electric field and the difference in torque before and after the application of the electric field becomes small because the concentration of the poly(γ-benzyl L-glutamate) is so high that the fluid exhibits liquid crystalline properties. As a result, the large difference in torque necessary for commercial application of the liquid cannot be obtained. In addition, contrary to general expectations, the viscosity may sometimes be decreased when an electric field is applied, thus, presenting a problem, e.g., in controlling viscosity.

The object of the present invention is to provide a homogeneous electro rheological fluid thereby circumventing the problem associated with the precipitation of particles, wherein the fluid can provide a large difference in torque before and after the application of an electric field.

The present inventors have intensively investigated to solve the above-described problems, and as a result, have found that the foregoing problem associated with the small difference in torque before and after the application of electric field can be circumvented by providing a homogeneous electro rheological fluid comprising a lyotropic liquid crystalline polymer dissolved in a solvent in low concentrations, said concentration being such that the fluid does not exhibit liquid crystalline properties. The present invention has been completed on the basis of this finding.

SUMMARY OF THE INVENTION

According to the first aspect of the present invention, there is provided an electro rheological fluid comprising a lyotropic liquid crystalline polymer dissolved in a solvent in low concentration, said concentration being such that the fluid does not exhibit liquid crystalline properties. The lyotropic liquid crystalline polymer is selected from the group consisting of polyisocyanates, polysiloxane esters, aromatic polyesters, β-aspartate polymers, aromatic polyamides, cellulose and derivatives thereof, polyamide hydrazines, polyhydrazines, polyphosphazenes, amphiphatic block copolymers, ribonucleic acid, deoxyribonucleic acid, polyacrylic esters, polymethacrylic esters, and γ-glutamate polymers having a repeating unit represented by the following general formula:

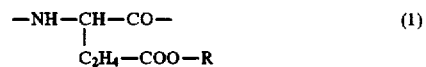

wherein, R has from 1 to 7 carbon atoms and is an alkyl group, an aralkyl group, an aryl group, cycloalkyl group, or mixed groups thereof.

According to the second aspect of the present invention there is provided a homogeneous electro rheological fluid wherein the concentration of the lyotropic liquid crystalline polymer in the solvent is between 0.1 and 14% by weight.

Examples of the lyotropic liquid crystalline polymers which can be used in the present invention include polymers selected from the group consisting of polyisocyanates, polysiloxane esters, aromatic polyesters, β-aspartate polymers, aromatic polyamides, cellulose and derivatives thereof, polyamide hydrazines, polyhydrazines, polyphosphazenes, amphiphatic block copolymers, ribonucleic acid, deoxyribonucleic acid, polyacrylic esters, polymethacrylic esters, and γ-glutamate polymers having a repeating unit represented by the foregoing general formula (1).

Preferred lyotropic crystalline polymers are polyisocyanates, polysiloxane esters, aromatic polyesters, and γ-glutamate polymers having a repeating unit represented by the foregoing general formula (1). Among them are more preferably polyisocyanates and γ-glutamate polymers represented by the foregoing general formula (1).

An example of the γ-glutamate polymers includes γ-benzyl L-glutamate polymers. An example of the polyisocyanates include n-hexylisocyanate polymers.

Examples of R in the above general formula (1) include an alkyl group such as methyl, ethyl, propyl, butyl, pentyl, hexyl; an aryl group such as phenyl; an aralkyl group such as benzyl; a cycloalkyl group such as cyclohexyl. Preferred are methyl and benzyl groups.

The molecular weight of the lyotropic liquid crystalline polymer which can be used in the present invention is in the range of from 300 to 1,000,000, preferably from 1000 to 500,000. When the molecular weight is less than 300, the electro rheological effect becomes insufficient, and adversely, when it is in excess of 1,000,000, the solubility to the solvent impairs.

The above "low concentration" herein are those wherein the fluid which is the solution of the lyotropic liquid crystalline polymers of the present invention dissolved in water or a solvent do not exhibit liquid crystalline properties at 5° to 70° C., preferably 15° to 50° C. Liquid crystalline polymers will preferably present from 0.1 to 15% by weight, more preferably 0.1 to 10% by weight, most preferably 0.1 to 7% by weight, depending on the kind of the particular polymer. When the concentration is in excess of 15% by weight, the viscosity prior to the application of an electric field is too high and the difference in torque before and after the application of an electric field becomes small, and adversely, when it is less than 0.1% by weight, the electro rheological effect obtained is insufficient.

Preferred solvents are those in which liquid crystalline polymers can be dissolved. Examples of the solvents include a polar solvent such as dioxane, tetrahydrofuran, and cresol; a chlorine-type solvent such as dichloroethane, methylene chloride, chloroform, and chlorobenzene; a hydrocarbon-type solvent such as mineral oils, alkylbenzenes, and α-olefin polymers; an ester-type oil such as dibutyl phthalate, dioctyl phthalate, dibutyl sebacate, and mixtures thereof.

In case where the lyotropic crystalline polymer used is γ-glutamate polymer having a repeating unit represented by the foregoing general formula (1), particularly a polar solvent such as dioxane, tetrahydrofuran, and cresol; or a chlorine-type solvent such as dichloroethane, methylene chloride, chloroform, and chlorobenzene are preferably used.

The preferred boiling point of the used solvent is 150° C. or more. When it is less than 150° C. the liquid becomes unpreferably volatile.

The homogeneous electro rheological fluid of the present invention exhibits good electro rheological properties, therefore, is used in making engine mounts, damping apparatuses, clutches, torque converters, braking systems, valves, dampers, suspensions, actuators, vibrators, ink jet printers, and the like.

DETAILED DESCRIPTION OF THE PREFERRED EMBODIMENTS

The invention is further described in connection with several examples that follow, but are in no way limited by the following examples.

EXAMPLE 1

A poly(γ-benzyl L-glutamate) (SIGMA Chemical Co.) (0.5 g) (molecular weight=240,000) was dissolved in dichloroethane (9.5 g) to prepare an electro rheological liquid A.

The poly(γ-benzyl L-glutamate) was completely dissolved in dichloroethane. It was confirmed with a polarized light microscope (at 23° C.) that the electro rheological fluid A did not exhibit a liquid crystalline state.

The torque value of the electro rheological fluid A was determined by measurement with a double-cylindrical rotary viscometer fitted with an electrical field applicator (inside cylinder diameter 16 mm, outside cylinder diameter 18 mm) at 25° C., an applied voltage of 2 kV/mm, and a shear rate of 400 $s^{-1}$. The particular current value was also measured.

Table 1 shows the results. The torque value was determined by calculating the difference between the values before and after the application of an electric field.

EXAMPLE 2

A poly(γ-benzyl L-glutamate) (SIGMA Chemical Co.) (0.5 g) was dissolved in o-chlorobenzene (9.5 g) to prepare an electro rheological fluid B.

The poly(γ-benzyl L-glutamate) was completely dissolved in o-chlorobenzene. It was confirmed with a polarized light microscope (at 23° C.) that the electro rheological fluid B did not exhibit a liquid crystalline state.

The torque value of the electro rheological fluid B and the particular current value were determined by measurement in a similar manner as in Example 1. The results are also shown in Table 1.

EXAMPLE 3

A poly(n-hexylisocyanate) (prepared by polymerizing n-hexylisocyanate by use of sodium cyanate as a catalyst, molecular weight=120,000) (0.7 g) was dissolved in p-xylene (9.3 g) to prepare an electro rheological fluid C. The poly(n-hexylisocyanate) was completely dissolved in p-xylene. It was confirmed with a polarized light microscope (at 23° C.) that the electro rheological fluid C did not exhibit a liquid crystalline state.

The torque value of the electro rheological fluid C and the particular current value were determined by measurement in a similar manner as in Example 1. The results are also shown in Table 1.

COMPARATIVE EXAMPLE 1

A poly(γ-benzyl L-glutamate) (SIGMA Chemical Co.) (2.5 g) was dissolved in dichloroethane (7.5 g) to prepare an electro rheological fluid D. The poly(γ-benzyl L-glutamate) was completely dissolved in dichloroethane. It was confirmed with a polarized light microscope (at 23° C.) that the electro rheological fluid D exhibits a liquid crystalline state.

The torque value of the electro rheological fluid D and the particular current value were determined by measurement in a similar manner as in Example 1. The results are also shown in Table 1.

COMPARATIVE EXAMPLE 2

A poly(γ-benzyl L-glutamate) (SIGMA Chemical Co.) (2.5 g) was dissolved in o-chlorobenzene (7.5 g) to prepare an electro rheological fluid E. The poly(γ-benzyl L-glutamate) was completely dissolved in o-chlorobenzene. It was confirmed with a polarized light microscope (at 23° C.) that the electro rheological fluid E exhibits a liquid crystalline state.

The torque value of the electro rheological fluid E and the particular current value were determined by measurement in a similar manner as in Example 1. The results are also shown in Table 1.

COMPARATIVE EXAMPLE 3

A poly(n-hexylisocyanate) (3 g) which was the same as used in Example 3) was dissolved in p-xylene (7 g) to prepare an electro rheological fluid F. The poly(n-hexylisocyanate) was completely dissolved in p-xylene. It was confirmed with a polarized light microscope (at 23° C.) that the electro rheological fluid F exhibits a liquid crystalline state.

The torque value of the electro rheological fluid F and the particular current value were determined by measurement in a similar manner as in Example 1. The results are also shown in Table 1.

TABLE 1

Electro Rheological Effect

| Electro Rheologocial Fluid | Torque Value (g · cm) | Electric Current (μA) |
|---|---|---|
| Example 1 | A | 118 | 939 |
| Example 2 | B | 109 | 891 |
| Example 3 | C | 91 | 262 |
| Comparative Example 1 | D | 79 | 4739 |
| Comparative Example 2 | E | −11 | 3574 |
| Comparative Example 3 | F | 71 | 498 |

As shown in Examples 1–3 and Comparative Examples 1–3, the homogeneous electro rheological fluid according to the present invention, which comprises a lyotropic liquid crystalline polymer dissolved in a solvent in low concentrations in a manner in which the fluid does not exhibit a liquid crystalline state, can avoid the problem associated with the precipitation of particles, and the difference in torque before and after the application of an electric field which is surprisingly larger than the corresponding difference for the electro rheological fluid wherein the fluid exhibits a liquid crystalline state. In addition, the foregoing problem associated with the decrease in torque when an electric field is applied may be avoided.

What is claimed is:

1. An electro rheological fluid consisting essentially of a lyotropic liquid crystalline polyisocyanate polymer dissolved in an electrically insulating solvent therefor in a concentration of from 0.1 to 7 percent by weight of the solvent, said concentration being such that the fluid does not exhibit liquid crystalline properties.

2. An electro rheological fluid according to claim 1, wherein the lyotropic liquid crystalline polymer has a molecular weight of 300 to 1,000,000.

3. An electro rheological fluid according to claim 2, wherein the molecular weight is 1,000 to 500,000.

4. An electro rheological fluid according to claim 3, wherein the solvent is a polar solvent having a boiling point of at least 150° C.

5. An electro rheological fluid according to claim 3, wherein the solvent is a chlorine-containing solvent having a boiling point of at least 150° C.

6. An electro rheological fluid according to claim 4, wherein the solvent is a chlorine-containing solvent having a boiling point of at least 150° C.

7. An electro rheological fluid according to claim 1, wherein the solvent is a polar solvent having a boiling point of at least 150° C.

8. An electro rheological fluid according to claim 1, wherein the solvent is a chlorine-containing solvent having a boiling point of at least 150° C.

* * * * *